(12) United States Patent
Yu

(10) Patent No.: US 11,381,272 B2
(45) Date of Patent: Jul. 5, 2022

(54) APPARATUS AND METHOD FOR CONTROLLING TRANSMISSION POWER

(71) Applicant: SAMSUNG ELECTRONICS CO., LTD., Suwon-si (KR)

(72) Inventor: Hyunseok Yu, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 16/905,183

(22) Filed: Jun. 18, 2020

(65) Prior Publication Data
US 2021/0067189 A1 Mar. 4, 2021

(30) Foreign Application Priority Data
Sep. 3, 2019 (KR) .................. 10-2019-0108941

(51) Int. Cl.
*H04W 24/10* (2009.01)
*H04B 1/3827* (2015.01)
*H04W 52/26* (2009.01)
*H04W 52/36* (2009.01)

(52) U.S. Cl.
CPC .......... *H04B 1/3838* (2013.01); *H04W 24/10* (2013.01); *H04W 52/265* (2013.01); *H04W 52/367* (2013.01)

(58) Field of Classification Search
CPC .................................................. H04W 24/10
USPC ......................................................... 370/329
See application file for complete search history.

(56) References Cited

U.S. PATENT DOCUMENTS

| | | | |
|---|---|---|---|
| 7,146,139 B2 | 12/2006 | Nevermann | |
| 9,642,096 B2 * | 5/2017 | Capomaggio | H04W 52/34 |
| 10,038,465 B2 | 7/2018 | Park et al. | |
| 10,251,137 B2 | 4/2019 | Kim et al. | |
| 2005/0113125 A1 | 5/2005 | Kang | |
| 2019/0141692 A1 | 5/2019 | Subramanian et al. | |

FOREIGN PATENT DOCUMENTS

| | | |
|---|---|---|
| JP | 2012-239108 | 12/2012 |
| JP | 5748635 | 5/2015 |
| KR | 10-2015-0048065 | 5/2015 |

* cited by examiner

*Primary Examiner* — Dang T Ton
(74) *Attorney, Agent, or Firm* — F. Chau & Associates, LLC

(57) ABSTRACT

An apparatus and method are provided for controlling a transmission power of a wireless communications device to comply with an output energy limit during a measurement period, including calculating a target output energy based on a communications channel; calculating a first average output energy corresponding to a previous period having a duration substantially equal to the measurement period; calculating a second average output energy by low-pass-filtering the target output energy and the first average output energy; and limiting the transmission power of the wireless communications device based on an energy margin between the output energy limit and the second average output energy.

20 Claims, 17 Drawing Sheets

| ΔE | $P_{backoff}$ (dBm) |
|---|---|
| 1 ≤ ΔE < 4 | 3.5 |
| 4 ≤ ΔE < 5 | 3.0 |
| 5 ≤ ΔE < 6 | 2.5 |
| ... | ... |
| 8 ≤ ΔE < 9 | 0.5 |
| 9 ≤ ΔE | 0 |

APPARATUS AND METHOD FOR CONTROLLING TRANSMISSION POWER

CROSS-REFERENCE TO RELATED APPLICATIONS

This application claims priority under 35 U.S.C. § 119 to Korean Patent Application No. 10-2019-0108941, filed on Sep. 3, 2019 in the Korean Intellectual Property Office, the disclosure of which is incorporated by reference herein in its entirety.

TECHNICAL FIELD

Exemplary embodiments of the present inventive concept relate to wireless communications, and more particularly, to an apparatus and method for controlling transmission power.

DISCUSSION OF RELATED ART

Signal transmission in a wireless communications system may be affected by path loss, shadow fading, and the like, and thus sufficient power should be used to maintain quality of service (QoS). In particular, for wireless communications using easily attenuated high-frequency electromagnetic signals such as millimeter-wave (mmWave) signals, relatively high transmission power may be required to overcome such losses. However, when transmission power is increased, heat generated by a wireless communications device may be increased and/or high-density electromagnetic waves may be generated in a transmission process. As such, heat and energy absorbed by a user of a wireless communications device may be undesirably elevated due to the electromagnetic waves.

SUMMARY

Exemplary embodiments of the present inventive concept provide a method and apparatus for maintaining quality of service (QoS) in wireless communications and efficiently reducing exposure of a user to electromagnetic waves.

According to an exemplary embodiment of the inventive concept, a method is provided for controlling a transmission power of a wireless communications device to comply with an output energy limit during a measurement period, the method including calculating a target output energy based on a communications channel; obtaining a first average output energy corresponding to a previous period having a duration substantially equal to the measurement period; calculating a second average output energy by low-pass-filtering the target output energy and the first average output energy; and limiting the transmission power of the wireless communications device based on an energy margin between the output energy limit and the second average output energy.

According to an exemplary embodiment of the inventive concept, a method is provided for controlling a transmission power of a wireless communications device to comply with an output energy limit during a measurement period, the method including calculating a target output energy for at least one of the plurality of windows based on a communications channel; obtaining a first remaining output energy for a first of the plurality of windows based on the output energy limit and the target output energy; calculating a second remaining output energy for a remainder of the plurality of windows based on the target output energy and the first remaining output energy; and limiting the transmission power based on the output energy limit and the second remaining output energy.

According to an exemplary embodiment of the inventive concept, a wireless communications device is provided for controlling a transmission power to comply with an output energy limit during a measurement period divided into a plurality of windows, the wireless communications device including at least one antenna module comprising an antenna, a power detector, and a temperature sensor; a back-end module configured to provide, to the at least one antenna module, a high-frequency signal generated by processing a baseband signal in a transmission mode; and a signal processing unit configured to generate the baseband signal in the transmission mode, wherein the signal processing unit is further configured to adjust target output energy for a current one of the plurality of windows based on measurement information provided from the power detector and the temperature sensor, calculate an energy margin based on output energy output during a previous at least one of the plurality of windows, the adjusted target output energy and the output energy limit, and limit the transmission power based on the energy margin.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
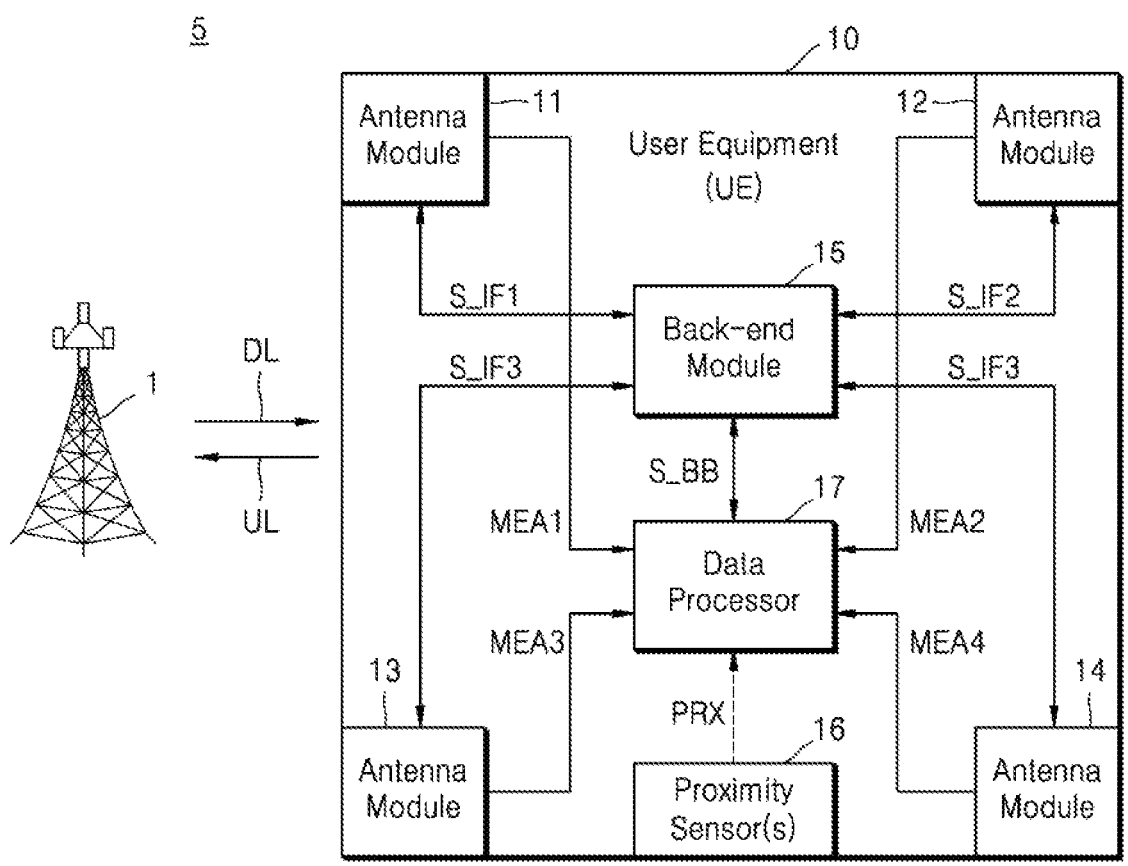
FIG. 1 is a schematic block diagram of a wireless communications system according to an exemplary embodiment of the inventive concept.

FIG. 1 shows a wireless communications system 5 according to an exemplary embodiment of the inventive concept. The wireless communications system 5 may include, but is not limited to, a wireless communications system using a cellular network such as, for example, a $5^{th}$-generation (5G) new radio (NR) system, a long term evolution (LTE) system, an LTE-advanced (LTE-A) system, a code-division multiple access (CDMA) system, a global system for mobile communications (GSM) system, a wireless personal area network (WPAN) system, or another arbitrary wireless communications system. The wireless communications system 5 will be described below on the basis of a 5G NR system as a wireless communications system using a cellular network, but embodiments of the inventive concept are not limited thereto.

A base station (BS) 1 may generally refer to a fixed station communicating with user equipment (UE) devices and/or other base stations, to communicate and exchange data and control information with the UEs and/or the other BSs. For example, the BS 1 may be called a Node B, an evolved Node B (eNB), a next generation Node B (gNB), a sector, a site, a base transceiver system (BTS), an access point (AP), a relay node, a remote radio head (RRH), a radio unit (RU), or a small cell. In this specification, a BS or a cell may be comprehensively understood as a partial area covered by or the function of a BS controller (BSC) of CDMA, a Node-B of wideband CDMA (WCDMA), an eNB of LTE, a gNB of 5G, or a sector (or a site), and may have various coverage areas such as megacell, macrocell, microcell, picocell, femtocell, relay node, RRH, RU, small cell coverage areas, and the like.

A UE 10 may refer to any of arbitrary stationary or mobile devices capable of communicating with and transmitting and receiving data and/or control information to and from a BS, such as the BS 1. For example, the UE 10 may be called a terminal, terminal equipment, a mobile station (MS), a mobile terminal (MT), a user terminal (UT), a subscriber station (SS), a wireless device, or a handheld device. Exemplary embodiments of the inventive concept will be described below on the basis of the UE 10 as a wireless communications device, but are not limited thereto.

A wireless communications network between the UE 10 and the BS 1 may support communications between a plurality of users by sharing available network resources. For example, in the wireless communications network, information may be transmitted using various multiple access methods such as code-division multiple access (CDMA), frequency-division multiple access (FDMA), time-division multiple access (TDMA), orthogonal frequency-division multiple access (OFDMA), single-carrier frequency-division multiple access (SC-FDMA), orthogonal frequency-division multiplexing (OFDM)-FDMA, OFDM-TDMA, and OFDM-CDMA or the like. As illustrated in FIG. 1, the UE 10 may communicate with the BS 1 through an uplink (UL) from the UE to the BS and a downlink (DL) from the BS to the UE. In some embodiments, as in device-to-device (D2D) communication, UEs may communicate with each other through one or more sidelinks.

As illustrated in FIG. 1, the UE 10 may include first to fourth antenna modules 11 to 14, a back-end module 15, at least one proximity sensor 16, and a data processor 17. In some embodiments, the first to fourth antenna modules 11 to 14 may be spaced apart from each other and be packaged independently. In some embodiments, the back-end module 15 and the data processor 17 may be packaged independently or together.

Each of the first to fourth antenna modules 11 to 14 may include at least one antenna and process signals received and to be transmitted through the antenna. In some embodiments, the first to fourth antenna modules 11 to 14 may generate or process first to fourth intermediate-frequency (IF) signals S_IF1 to S_IF4. For example, the first antenna module 11 may generate the first IF signal S_IF1 by using a radio-frequency (RF) signal received through the antenna, or the first antenna module may output through the antenna an RF signal generated by processing the first IF signal S_IF1 provided from the back-end module 15. In some embodiments, each of the first to fourth antenna modules 11 to 14 may be called a front-end module or an RF module. The structure of the exemplary first to fourth antenna modules 11 to 14 will be described below with reference to FIG. 4.

Short-wavelength signals may have strong directionality in a high-frequency band such as a millimeter-wave (mm-Wave) band, and thus quality of service (QoS) may be affected by obstructions and/or antenna directions. As such, in a wireless communications system that uses a high-frequency band to increase a data rate, a transmitter may use high transmission power such that a user of the UE 10 might be exposed to electromagnetic waves generated by the first to fourth antenna modules 11 to 14. When each of the first to fourth antenna modules 11 to 14 includes a plurality of antennas for beamforming, spatial diversity, polarization diversity, spatial multiplexing, or the like, total radiated power output from the UE 10 may be increased over a unit having fewer antenna modules. When the UE 10 supports multiple connectivity to two or more wireless communications systems, e.g., dual connectivity, the Total Power Radiometer (TPR) radiated power measurement may also be increased.

Metrics such as a specific absorption rate (SAR) and a maximum permissible exposure (MPE) may be regulated to limit energy absorbed by a human body due to non-ionizing electromagnetic waves. Wireless communications devices need to comply with these or like metrics regulated by government agencies such as the US Federal Communications Commission (FCC). For example, the average energy measured from the UE 10 during a certain measurement period may be limited, and the measurement period may differ depending on a frequency band. As such, although the UE 10 may be allowed to use a relatively high transmission power over a relatively short period, the average of output energy during the measurement period may be more limited by the applicable regulations. In the following description, exemplary embodiments of the inventive concept will be described on the basis of a SAR, and metrics that the UE 10 needs to comply with will be referred to as SAR regulations.

The back-end module 15 may process or generate a baseband signal S_BB. For example, the back-end module 15 may generate at least one of the first to fourth IF signals S_IF1 to S_IF4 by processing the baseband signal S_BB provided from the data processor 17, or generate the baseband signal S_BB by processing at least one of the first to fourth IF signals S_IF1 to S_IF4 received from the antenna modules. In some embodiments different from the illustration of FIG. 1, the first to fourth antenna modules 11 to 14 may separately generate baseband signals and provide the baseband signals to the data processor 17 and, in this case, the back-end module 15 may be omitted.

The data processor 17 may extract information provided by the BS 1, such as payload data from the BS 1, from the baseband signal S_BB received from the back-end module 15, or the data processor 17 may generate the baseband signal S_BB including information to be provided to the BS 1, such as payload data from the UE 10. The data processor 17 may include a hardware block designed through logic synthesis, or include a software module including a series of instructions and a processing block including a processor for executing the instructions. The data processor 17 may be called a communications processor, a baseband processor, or a modem and, in this specification, the data processor 17 may be called a signal processing unit.

As illustrated in FIG. 1, the data processor 17 may receive first to fourth measurement signals MEA1 to MEA4, respectively, from the first to fourth antenna modules 11 to 14. For example, as further described below with reference to FIG. 4, the first antenna module 11, which may include a power detector and/or a temperature sensor, may provide to the data processor 17 the first measurement signal MEA1 including measurement information indicating detected transmission power and/or sensed temperature. The data processor 17 may accurately recognize power or energy output from the first to fourth antenna modules 11 to 14 based on the first to fourth measurement signals MEA1 to MEA4, and thus transmission power may be controlled based on the actual output power, energy or temperatures of the UE 10.

The at least one proximity sensor 16 may detect an external object or being in contact with or in the proximity of the UE 10. The at least one proximity sensor 16 may detect the external object in an arbitrary manner and may include, but is not limited to, for example, a capacitive sensor, a temperature sensor, a grip sensor, and a time of flight (ToF) sensor. As illustrated in FIG. 1, the data processor 17 may obtain proximity information PRX from the at least one proximity sensor 16. The data processor 17 may receive the proximity information PRX directly from the at least one proximity sensor 16 or from another element communicating with the at least one proximity sensor 16, such as, for example, from a main processor 48 of FIG. 4. In some embodiments, the data processor 17 may directly generate the proximity information PRX by using the first to fourth antenna modules 11 to 14. For example, the data processor 17 may detect the external object in the proximity of the first to fourth antenna modules 11 to 14 or detect a distance to the external object by measuring reflection coefficients of the antennas included in the first to fourth antenna modules 11 to 14, or by analyzing correlations between signals provided to the first to fourth antenna modules 11 to 14 and signals received from the first to fourth antenna modules 11 to 14. The data processor 17 may adjust transmission power for any or all of the antenna modules based on the proximity information PRX, and thus the UE 10 may limit the transmission power for any or all of the antenna modules when the external object or being is in the proximity of the UE 10 or a given antenna module, or provide improved QoS when the external object is not in the proximity of the UE 10 or the given antenna module.

Figure 2:
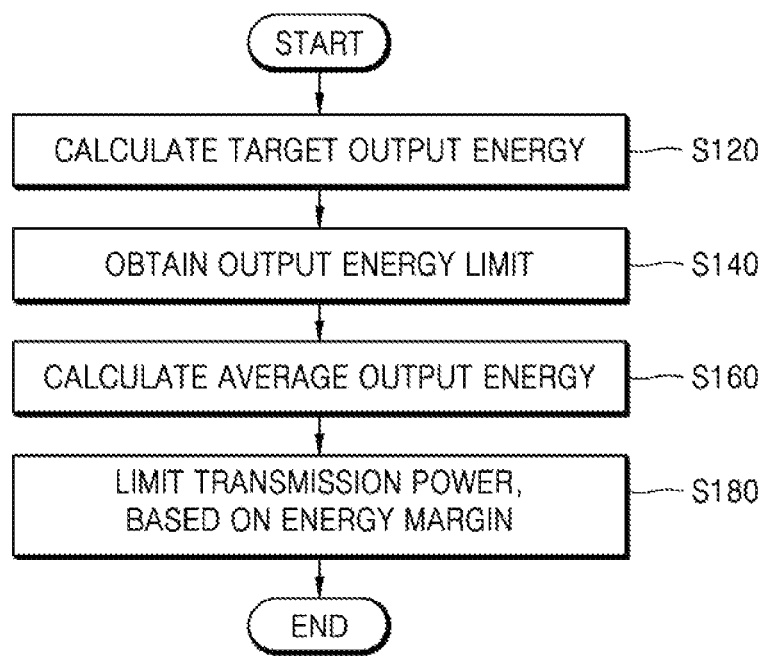
FIG. 2 is a flowchart of a method for controlling transmission power according to an exemplary embodiment of the inventive concept.

FIG. 2 shows a method for controlling transmission power, according to an exemplary embodiment of the inventive concept. As illustrated in FIG. 2, the method for controlling transmission power may include a plurality of operations S120, S140, S160, and S180. In some embodiments, the method of FIG. 2 may be performed by the data processor 17 of FIG. 1, and FIG. 2 will now be described in conjunction with FIG. 1.

Referring to FIG. 2, in the operation S120, a target output energy may be calculated. In some embodiments, the data processor 17 may calculate the target output energy based on a communications channel with the BS 1. For example, the data processor 17 may determine target transmission power based on a radio resource control (RRC) message, a medium access control (MAC) control element (CE) message, or downlink control information (DCI), and the target output energy may be calculated based on the target transmission power and a period in which the target transmission power is output. In some embodiments, the data processor 17 may more accurately calculate the target output energy by adjusting the target output energy based on measurement information. Examples of the operation S120 will be further described below with reference to FIGS. 3 and 5.

In the next operation S140, an output energy limit may be obtained. The output energy limit may be determined according to SAR regulations. For example, a relationship between energy output from the UE 10 and a SAR measured from the UE 10 may be obtained through tests and/or simulations, and the output energy limit may be determined as output energy corresponding to a value of a SAR that the UE 10 needs to comply with during a measurement period. As such, when energy output from the UE 10 during the measurement period is controlled to be less than the output energy limit, the UE 10 may comply with the SAR regulations. In some embodiments, the UE 10 may include a non-volatile memory storing the output energy limit and, as further described below with reference to FIG. 6, the data processor 17 may adjust the output energy limit based on the proximity information PRX.

In the next operation S160, an average output energy may be calculated. The average output energy may refer to an average of an output energy predicted during the measurement period due to the target output energy calculated in operation S120. As further described below with reference to FIG. 8, the data processor 17 may calculate the average output energy through low-pass filtering.

In the next operation S180, transmission power may be limited based on an energy margin. For example, the data processor 17 may calculate the energy margin between the output energy limit obtained in operation S140 and the average output energy calculated in operation S160. The data processor 17 may determine whether to limit the target transmission power based on the energy margin, and determine a reduction in the target transmission power, here called a backoff power, upon determining to limit the target transmission power. In some embodiments, when QoS deterioration is predicted due to a reduction in the transmission power, the data processor 17 may attempt to switch in or out an antenna module. An example of the operation S180 will be further described below with reference to FIG. 9.

Figure 3:
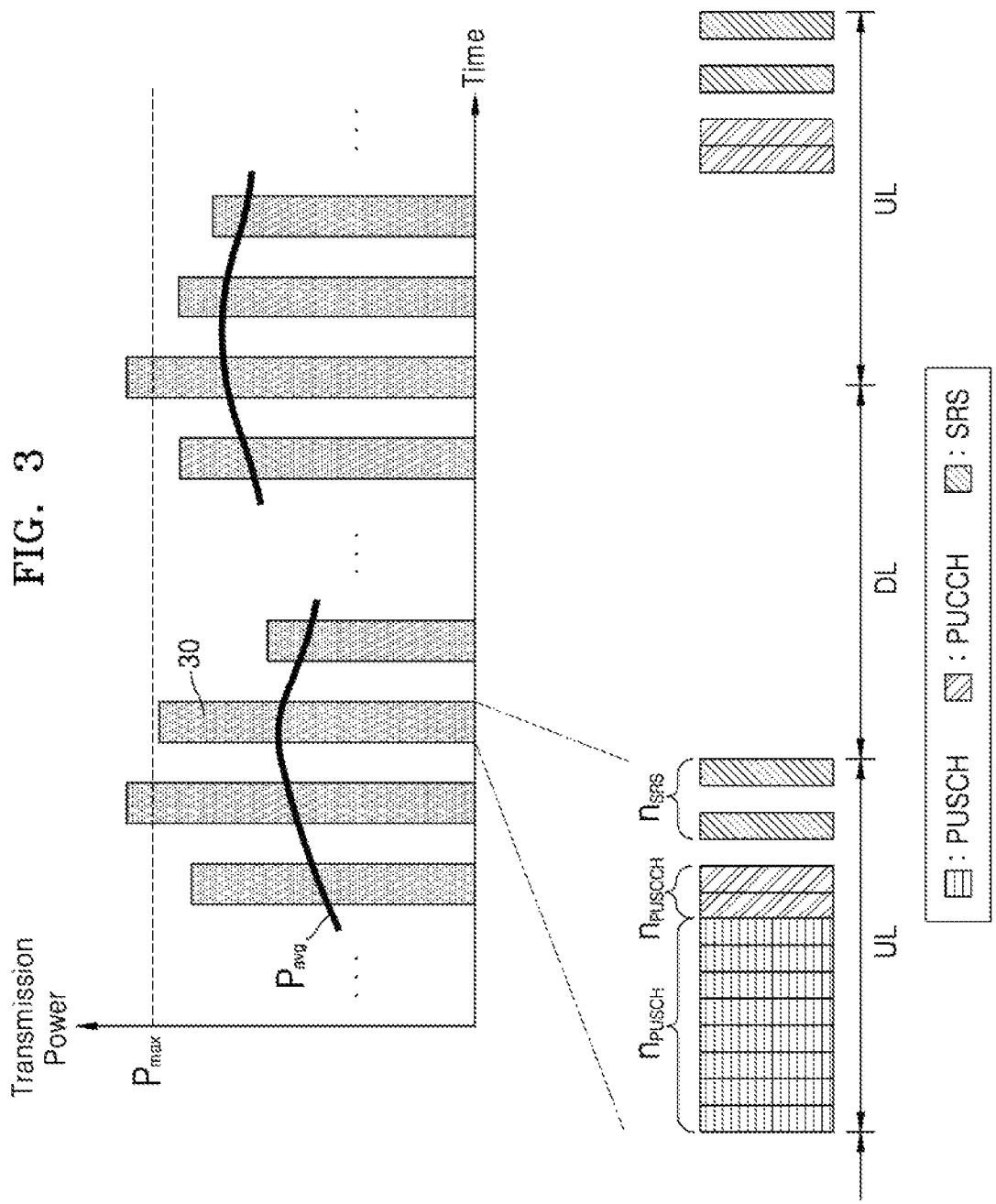
FIG. 3 is a graphical diagram for describing an operation of calculating target transmission power according to an exemplary embodiment of the inventive concept.

FIG. 3 shows an operation of calculating a target transmission power according to an exemplary embodiment of the inventive concept. Specifically, FIG. 3 shows an example of the operation S120 of FIG. 2 in a wireless communications system employing time-division duplexing (TDD), and may be similarly applied to a wireless communications system employing frequency-division duplexing (FDD). FIG. 3 will now be described in conjunction with FIG. 1.

A maximum transmission power $P_{max}$ required to comply with an output energy limit may correspond to a value obtained by dividing the output energy limit by a measurement period. As such, in may be necessary to control an average transmission power $P_{avg}$, indicating an average of transmission power values during the measurement period, to be less than the maximum transmission power $P_{max}$. For example, as illustrated in FIG. 3, although the transmission power exceeds the maximum transmission power $P_{max}$ at some instants in time, the average transmission power $P_{avg}$ is less than or equal to the maximum transmission power $P_{max}$ when averaged over the regulated measurement period such that the UE 10 may comply with the SAR regulations. In some embodiments, the data processor 17 may change the transmission power per unit interval, such as, for example, per slot, and where transmission power values of a sound reference signal (SRS), a physical uplink control channel (PUCCH), and a physical uplink shared channel (PUSCH) in a $k^{th}$ slot are respectively denoted by $P_{SRS}(k)$, $P_{PUCCH}(k)$, and $P_{PUSCH}(k)$, target transmission power $P_{target}(k)$ of the $k^{th}$ slot may be calculated as shown in [Equation 1].

$$P_{target}(k) = P_{SRS}(k) \cdot n_{SRS}(k) + P_{PUCCH}(k) \cdot n_{PUCCH}(k) + P_{PUSCH}(k) \cdot n_{PUSCH}(k)$$ [Equation 1]

In [Equation 1], $n_{SRS}(k)$, $n_{PUCCH}(k)$, and $n_{PUSCH}(k)$ respectively denote the numbers of symbols of the SRS, the PUCCH, and the PUSCH included in the $k^{th}$ slot. For example, in a slot 30 of FIG. 3, $n_{SRS}(k)$, $n_{PUCCH}(k)$ and $n_{PUSCH}(k)$ may respectively be 2, 2, and 8. As such, when a duration or a length or a period of a symbol is denoted by $T_{symbol}$, target output energy $E_{target}(k)$ of the $k^{th}$ slot may be calculated as shown in [Equation 2].

$$E_{target}(k) = T_{symbol} \cdot P_{target}(k)$$ [Equation 2]

Figure 4:
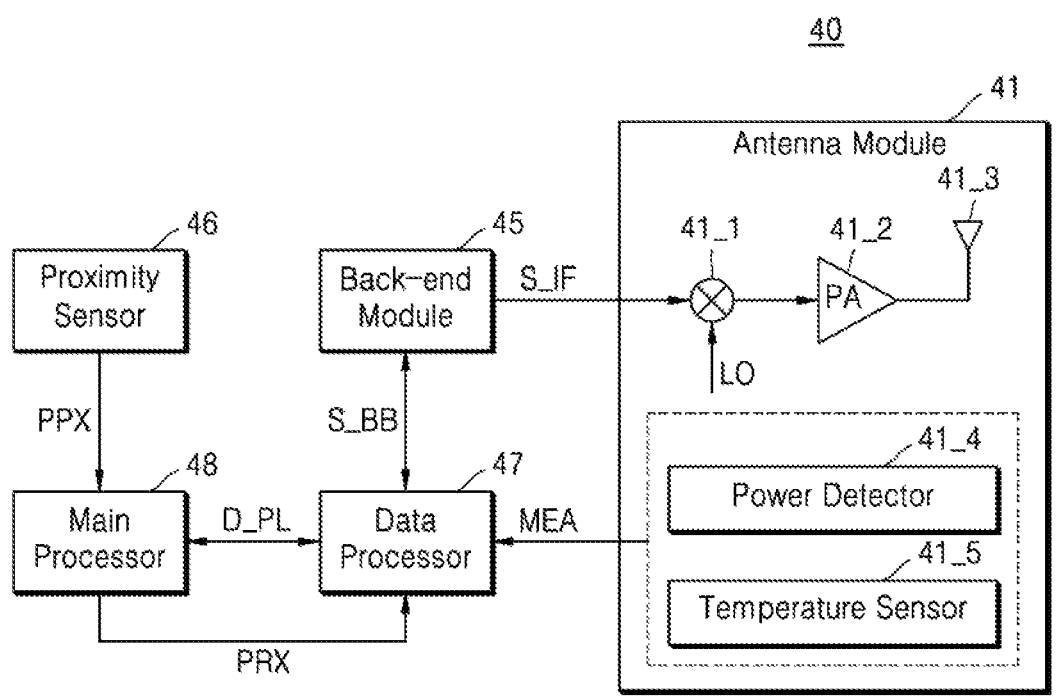
FIG. 4 is a schematic block diagram of a wireless communications device according to an exemplary embodiment of the inventive concept.

FIG. 4 shows a wireless communications device according to an exemplary embodiment of the inventive concept. Specifically, the block diagram of FIG. 4 illustrates a UE 40 including an antenna module 41 as an example of one of the first to fourth antenna modules 11 to 14 of FIG. 1. Descriptions provided above in relation to FIG. 1 will be omitted herein to avoid redundancy.

Referring to FIG. 4, the UE 40 may include the antenna module 41, a back-end module 45, a data processor 47, a main processor 48, and a proximity sensor 46. The antenna module 41 may include a mixer 41_1 and a power amplifier 41_2 to process an IF signal S_IF provided from the back-end module 45, and include an antenna 41_3. The mixer 41_1 may up-convert the IF signal S_IF by using a local oscillator signal LO, and the power amplifier 41_2 may provide, to the antenna 41_3, a signal amplified based on controlled transmission power. Although not shown in FIG. 4, the antenna module 41 may further include elements for processing an RF signal received through the antenna 41_3, and/or further include switches for switching between a transmission mode and a reception mode. The antenna module 41 may further include a power detector 41_4 and/or a temperature sensor 41_5. The power detector 41_4 may detect power of the signal output from the power amplifier 41_2, and the temperature sensor 41_5 may sense temperature of the antenna module 41, such as, for example, temperature of the power amplifier 41_2 and/or that of the power detector 41_4. A measurement signal MEA including measurement information indicating the power detected by the power detector 41_4 and/or the temperature sensed by the temperature sensor 41_5 may be provided to the data processor 47.

The data processor 47 may exchange a baseband signal S_BB with the back-end module 45, and exchange payload data D_PL with the main processor 48. The main processor 48 may control overall operations of the UE 40, execute an operating system and/or application programs in some embodiments and then be called an application processor. The main processor 48 may receive proximity information PRX from the proximity sensor 46, and transmit the received proximity information PRX to the data processor 47.

Figure 5:
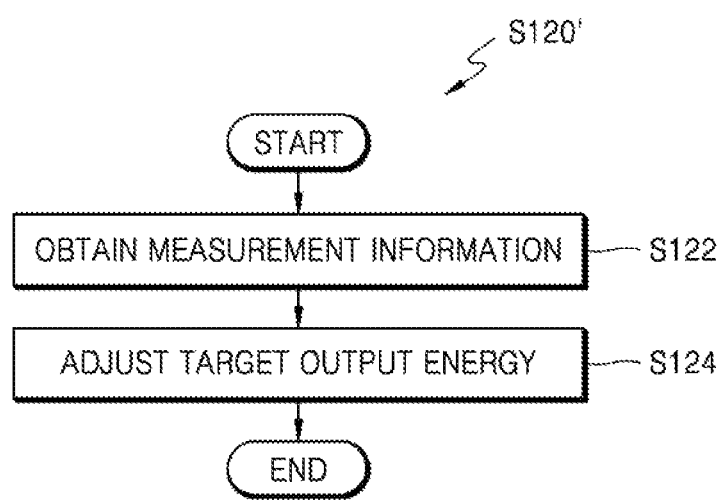
FIG. 5 is a flowchart of a method for controlling transmission power according to an exemplary embodiment of the inventive concept.

FIG. 5 shows a method for controlling transmission power, according to an exemplary embodiment of the inventive concept. Specifically, the flowchart of FIG. 5 shows an alternate example of the operation S120 of FIG. 2, and target output energy may be calculated in the operation S120' of FIG. 5 similarly to that as described above in relation to FIG. 2. In some embodiments, an alternate operation S120' may be performed by the data processor 47 of FIG. 4, so FIG. 5 will now be described in conjunction with FIG. 4.

Referring to FIG. 5, the operation S120' may include operations S122 and S124. In the operation S122, measurement information may be obtained. For example, the data processor 47 may obtain the measurement information by using the measurement signal MEA provided from the antenna module 41. Actual power output from the antenna module 41 may differ from transmission power requested by the data processor 17. For example, the power amplifier 41_2 may have a high temperature due to high transmission power, where output power of the power amplifier 41_2 may be reduced due to the high temperature. As such, the power detector 41_4 may be used to detect actual rather than requested transmission power of a signal output from the power amplifier 41_2, and the temperature sensor 41_5 may be used to compensate for temperature characteristics of the power amplifier 41_2 and/or the power detector 41_4.

In the next operation S124, target output energy per measurement period and/or time slot may be adjusted. For example, the data processor 47 may adjust the target output energy based on the measurement information. Compensation power $P_{comp}$ for compensating for target transmission power $P_{target}$ may be represented by a function of the target transmission power $P_{target}$, power $P_{DET}$ detected by the power detector 41_4, and temperature $T_{SEN}$ sensed by the temperature sensor 41_5, as shown in [Equation 3].

$$P_{comp} = f(P_{target}, P_{DET}, T_{SEN})$$ [Equation 3]

A function f of [Equation 3] may be previously prepared through tests in a manufacturing process of the UE 40 or the antenna module 41, and be defined as a mapping table in some embodiments. As such, adjusted target output energy $E_{target}(k)'$ of a $k^{th}$ slot may be expressed as shown in [Equation 4].

$$E_{target}(k)' = T_{symbol}(P_{target}(k) + P_{comp})$$ [Equation 4]

Figure 6:
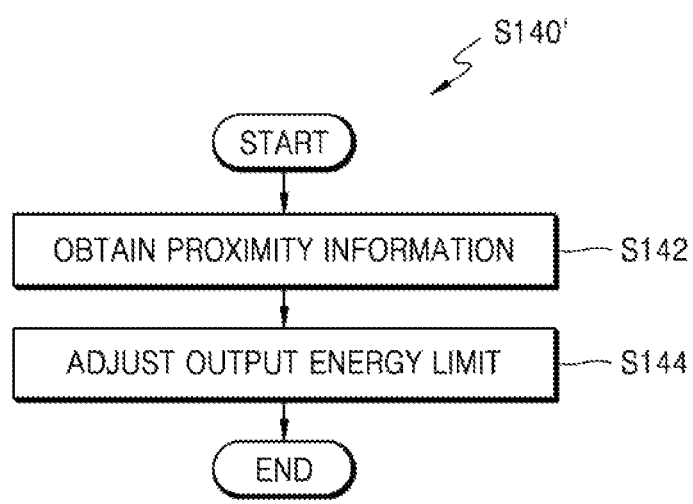
FIG. 6 is a flowchart of a method for controlling transmission power according to an exemplary embodiment of the inventive concept.
Figure 7:
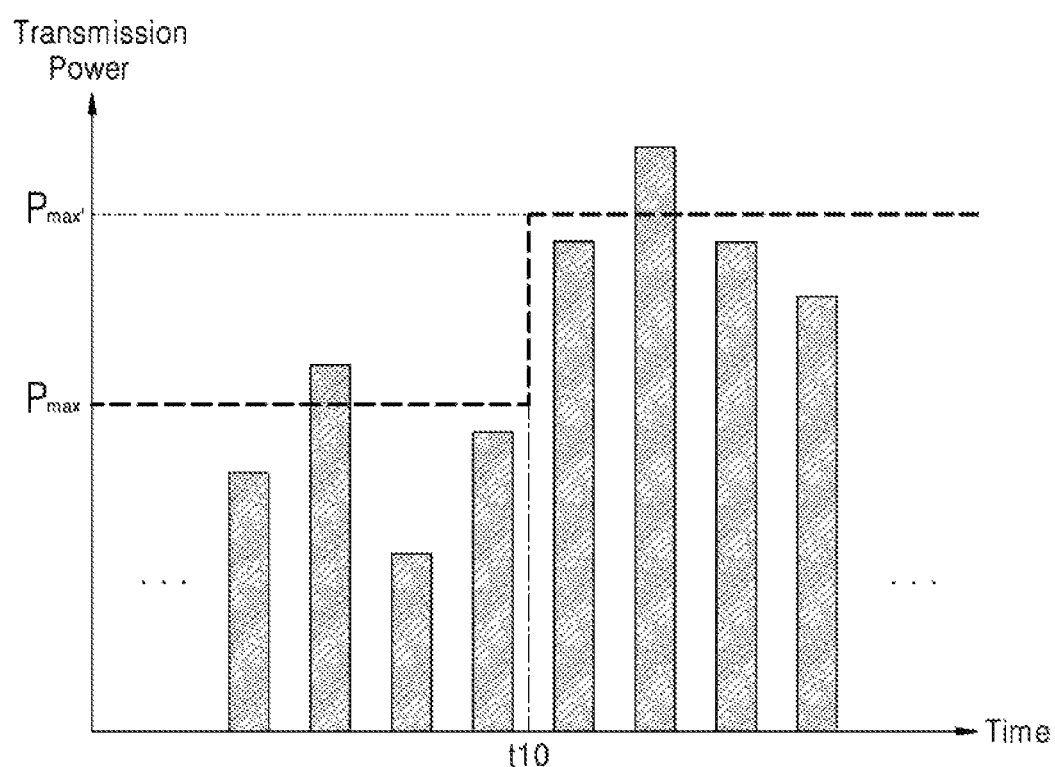
FIG. 7 is a graphical diagram for describing an operation of obtaining an output energy limit according to an exemplary embodiment of the inventive concept.

FIG. 6 shows a method for controlling transmission power, according to an exemplary embodiment of the inventive concept, and FIG. 7 shows an example of an alternate operation S140' of FIG. 6, according to an exemplary embodiment of the inventive concept. Specifically, the flowchart of FIG. 6 shows an example of operation S140 of FIG. 2. An output energy limit may be obtained in operation S140' of FIG. 6 as described above in relation to FIG. 2, and operation S140' may include operations S142 and S144 as illustrated in FIG. 6. In some embodiments, operation S140' may be performed by the data processor 47 of FIG. 4, so FIGS. 6 and 7 will now be described in conjunction with FIG. 4.

Referring to FIG. 6, in the operation S142, proximity information PRX may be obtained. For example, the data processor 47 may obtain the proximity information PRX through the main processor 48, or generate the proximity information PRX based on a reflection coefficient of the antenna module 41, a correlation between transmitted and received signals, or the like. As such, the data processor 47 may recognize whether an external object is in the proximity of the UE 40 and/or a distance between the external object and the UE 40 based on the proximity information PRX.

In the next operation S144, an output energy limit may be adjusted. For example, the data processor 47 may adjust the output energy limit to correspond to SAR regulations when an external object is in the proximity of the UE 40, or increase the output energy limit when an external object is not detected or is spaced away from the UE 40. Referring to FIG. 7, an external object might be detected until a time t10, and thus the data processor 47 may set maximum transmission power $P_{max}$ determined according to SAR regulations. From the time t10, the external object might have moved away and not be detected or be detected as being spaced far enough away from the UE 40, and thus the data processor 47 may set adjusted maximum transmission power $P_{max}'$, wherein the adjusted maximum transmission power $P_{max}'$ may be greater than the maximum transmission power $P_{max}$. As such, in an environment where a communications channel is not in a clear condition and thus high transmission power is required, transmission power may be increased after the time t10 and thus improved QoS may be achieved.

Figure 8:
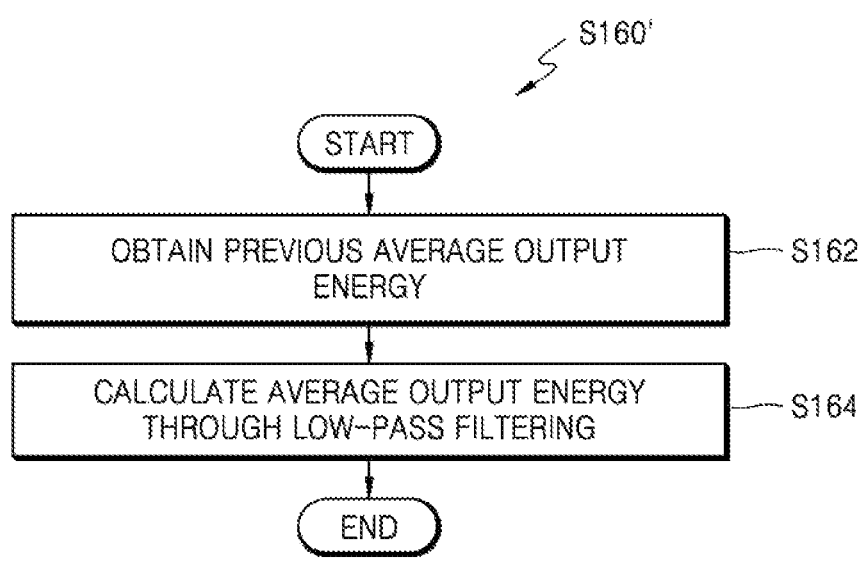
FIG. 8 is a flowchart of a method for controlling transmission power according to an exemplary embodiment of the inventive concept.

FIG. 8 shows a method for controlling transmission power according to an exemplary embodiment of the inventive concept. Specifically, the flowchart of FIG. 8 shows an alternate example of the operation S160 of FIG. 2. Average output energy may be calculated in an alternate operation S160' of FIG. 8 as described above in relation to FIG. 2. In some embodiments, operation S160' may be performed by the data processor 17 of FIG. 1, so FIG. 8 will now be described in conjunction with FIG. 1.

Referring to FIG. 8, the operation S160' may include operations S162 and S164. In the operation S162, the previous average output energy may be obtained. In some embodiments, the data processor 17 may obtain average output energy corresponding to a previous period having a duration equal to a measurement period. The previous average output energy may be an average output energy calculated in an operation S164 performed before operation S162, or an average output energy for which the transmission power limited in operation S180 of FIG. 2 is reflected.

In the next operation S164, the average output energy may be calculated through low-pass filtering. For example, the data processor 17 may calculate the average output energy by low-pass-filtering target output energy and the previous average output energy obtained in operation S162. In some embodiments, the data processor 17 may calculate the average output energy by finite impulse response (FIR)-filtering the target output energy and output energy values corresponding to unit intervals included in the previous period. Alternatively, in some embodiments, the data processor 17 may calculate the average output energy by infinite impulse response (IIR)-filtering, such as, for example, by accumulatively filtering the target output energy and the previous average output energy obtained in operation S162. For example, when an average output energy corresponding to a previous period including a $(k-1)^{th}$ slot is denoted by $E_{avg}(k-1)$, an average output energy $E_{avg}(k)$ corresponding to a period including a $k^{th}$ slot may be calculated as shown in [Equation 5].

$$E_{avg}(k)=(1-\alpha)E_{avg}(k-1)+\alpha \cdot E_{target}(k) \quad \text{[Equation 5]}$$

In [Equation 5], $\alpha$ may have a value between 0 and 1 ($0<\alpha<1$) and be determined based on a measurement period. For example, $\alpha$ may have a relatively small value when the measurement period is long, such as, for example, when a measurement frequency band is high, or have a relatively large value when the measurement period is short, such as, for example, when the measurement frequency band is low. In some embodiments, the target output energy $E_{target}(k)$ of [Equation 5] may be substituted by the adjusted target output energy $E_{target}(k)'$ of [Equation 4].

Figure 9:
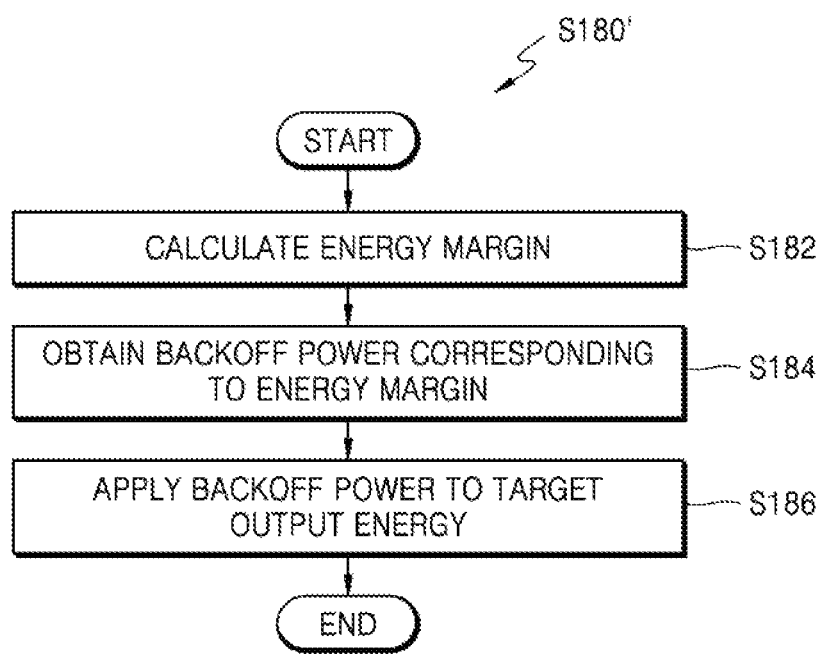
FIG. 9 is a flowchart of a method for controlling transmission power according to an exemplary embodiment of the inventive concept.
Figure 10:
FIG. 10 is a tabular diagram that shows an example of a lookup table usable to limit transmission power according to an exemplary embodiment of the inventive concept.

FIG. 9 shows a method for controlling transmission power according to an exemplary embodiment of the inventive concept, and FIG. 10 shows an example of a lookup table 100 usable to perform an alternate operation S180' of FIG. 9 according to an exemplary embodiment of the inventive concept. Specifically, the flowchart of FIG. 9 shows an example of the operation S180 of FIG. 2. Transmission power may be limited based on an energy margin in an operation S180' of FIG. 9 as described above in relation to FIG. 2, and the operation S180' may include operations S182, S184, and S186 as illustrated in FIG. 9. In some embodiments, the operation S180' may be performed by the data processor 17 of FIG. 1, so FIGS. 9 and 10 will now be described in conjunction with FIG. 1.

In the operation S182, an energy margin may be calculated. For example, an energy margin $\Delta E$ may be represented by a difference between an output energy limit $E_{max}$ and average output energy $E_{max}(k)$ as shown in [Equation 6].

$$\Delta E=E_{max}-E_{avg}(k)=P_{max} \cdot T_{mea}-E_{avg}(k) \quad \text{[Equation 6]}$$

In [Equation 6], $T_{mea}$ denotes a measurement period. In some embodiments, when the output energy limit $E_{max}$ is adjusted as described above in relation to FIGS. 6 and 7, the energy margin $\Delta E$ may be represented based on the adjusted output energy limit $E_{max}'$ as shown in [Equation 7].

$$\Delta E=E_{max}'-E_{avg}(k)=P_{max}' \cdot T_{mea}-E_{avg}(k) \quad \text{[Equation 7]}$$

A large value of the energy margin $\Delta E$ may mean that high transmission power is usable, and a small value of the energy margin $\Delta E$ may mean that limitation of transmission power is required.

In the next operation S184, a backoff power corresponding to the energy margin may be obtained. In some embodiments, as illustrated in FIG. 10, the data processor 17 may refer to the lookup table 100 including a plurality of energy margin-backoff power pairs, and obtain backoff power $P_{backoff}$ corresponding to the energy margin $\Delta E$ from the lookup table 100. The UE 10 may include a non-volatile memory accessible by the data processor 17, and the non-volatile memory may store the lookup table 100. For example, the backoff power $P_{backoff}$ may be 3.0 dBm when the energy margin $\Delta E$ is 4.5, or be 0 dBm when the energy margin $\Delta E$ is greater than 9. In some embodiments, the UE 10 may include an artificial neural network trained with a plurality of sample energy margin-backoff power pairs, and the data processor 17 may obtain the backoff power $P_{backoff}$ corresponding to the energy margin $\Delta E$ from the artificial neural network.

In the next operation S186, the backoff power may be applied to target output energy. For example, the data processor 17 may reduce transmission power by the backoff power, and control the first to fourth antenna modules 11 to 14 based on the reduced transmission power. As described below with reference to FIG. 11, the data processor 17 may attempt to switch an antenna module used for communication based on temperatures and/or transmission powers.

Figure 11:
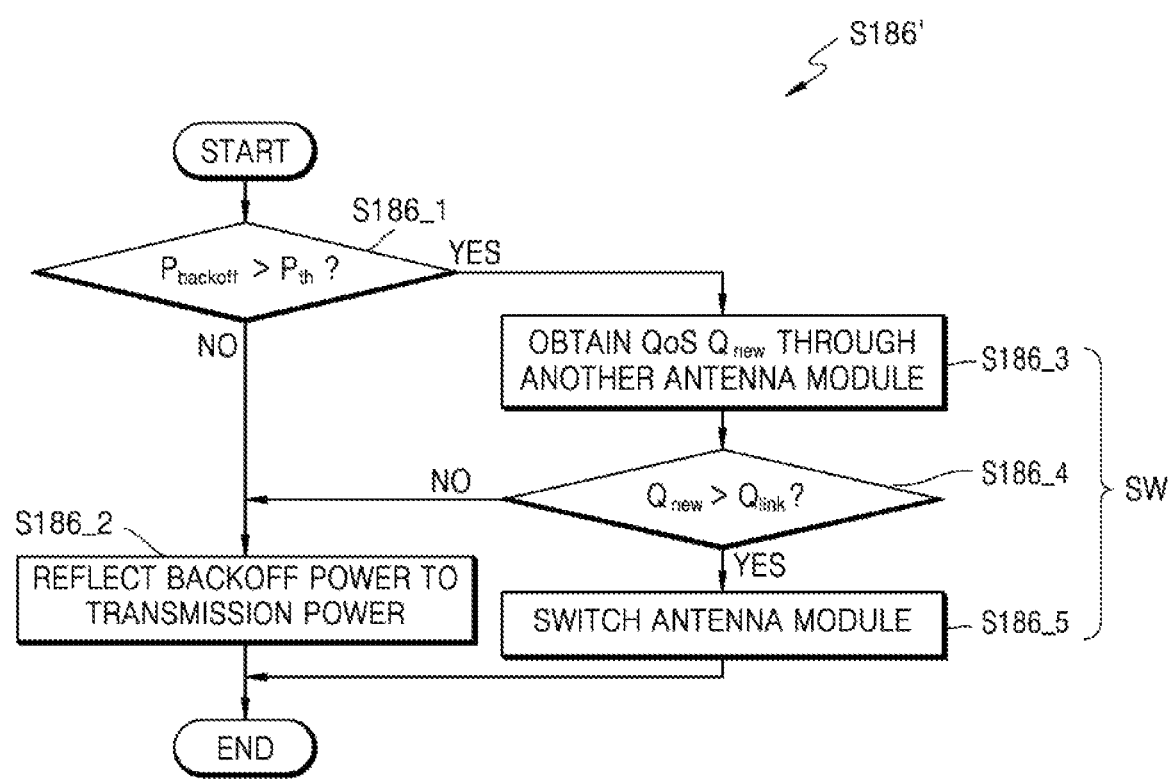
FIG. 11 is a flowchart of a method for controlling transmission power according to an exemplary embodiment of the inventive concept.

FIG. 11 shows a method for controlling transmission power according to an exemplary embodiment of the inventive concept. Specifically, the flowchart of FIG. 11 shows an alternate example of the operation S186 of FIG. 9. Backoff power may be applied to a target output energy in an alternate operation S186' of FIG. 11 as described above in relation to FIG. 9, and the operation S186' may include operations S186_1 to S186_5 as illustrated in FIG. 11. In some embodiments, operation S186' may be performed by the data processor 17 of FIG. 1, so FIG. 11 will now be described in conjunction with FIG. 1.

In the operation S186_1, backoff power $P_{backoff}$ may be compared to a threshold value $P_{th}$. A large value of the backoff power $P_{backoff}$ may cause a reduction in transmission power, and thus QoS may deteriorate. To minimize QoS deterioration, when the backoff power $P_{backoff}$ is greater than the threshold value $P_{th}$, switching of an antenna module may be attempted in operation SW as described below. Otherwise, when the backoff power $P_{backoff}$ is equal to or less than the threshold value $P_{th}$ as illustrated in FIG. 11 operation S186_2 may be is subsequently performed.

In the operation S186_2, the backoff power $P_{backoff}$ may be reflected to transmission power. For example, when the backoff power $P_{backoff}$ is greater than 0 (zero), the data processor 17 may reduce the transmission power of at least one of the first to fourth antenna modules 11 to 14 by the backoff power.

As illustrated in FIG. 11, operation SW for attempting to switch the antenna module may include a plurality of operations S186_3 to S186_5. In the operation S186_3, QoS $Q_{new}$ through another antenna module may be obtained. For example, when a communications channel with the BS 1 is formed through the current first antenna module 11, the data processor 17 may obtain the QoS $Q_{new}$ provided by a communications channel with the BS 1 through at least one of the second to fourth antenna modules 12 to 14. The QoS may be defined by, but is not limited to, for example, metrics such as a signal-to-interference-plus-noise ratio (SINR), a reference signal received power (RSRP), a received signal strength indicator (RSSI), a block error rate (BLER), and a bit error rate (BER). In some embodiments, the QoS $Q_{new}$ may correspond to QoS provided by a corresponding antenna module based on the transmission power reduced due to the backoff power $P_{backoff}$.

In the next operation S186_4, the obtained QoS $Q_{new}$ may be compared to a minimum QoS $Q_{link}$ required to maintain a link. As illustrated in FIG. 11, the operation S186_5 may be subsequently performed when the obtained QoS $Q_{new}$ is greater than the minimum QoS $Q_{link}$, or operation S186_2 may be subsequently performed when the obtained QoS $Q_{new}$ is equal to or less than the minimum QoS $Q_{link}$.

In some embodiments, in the operation S186_4, different from the illustration of FIG. 11, the obtained QoS $Q_{new}$ may be compared to QoS $Q_{old}$ provided by a current antenna module. For example, when the QoS $Q_{new}$ provided by the other antenna module is greater than the QoS $Q_{old}$ provided by the antenna module currently performing wireless communications ($Q_{new}>Q_{old}$), the data processor 17 may switch the antenna module. In some embodiments, the QoS $Q_{old}$ provided by the current antenna module may correspond to QoS estimated at the transmission power reduced based on the backoff power $P_{backoff}$.

In the operation S186_5, the antenna module may be switched. For example, the data processor 17 may select an antenna module providing QoS greater than the minimum QoS $Q_{link}$ from among the first to fourth antenna modules 11 to 14, and enable the selected antenna module to perform wireless communication. For example, the data processor 17 may switch the antenna module performing wireless communications from the first antenna module 11 to the second antenna module 12, and store context of the first antenna module 11 related to wireless communication, e.g., an RSSI or a beam index, in a memory. The data processor 17 may load context of the second antenna module 12 related to wireless communication from the memory and set the second antenna module 12 based on the loaded context. U.S. patent application Ser. No. 16/694,718, which was filed on Nov. 25, 2019 by the present applicant and the disclosure of which is incorporated by reference herein in its entirety, discloses examples of an operation performed to switch an antenna module, and at least one of the examples may be performed in operation S186_5 of FIG. 11.

Figure 12:
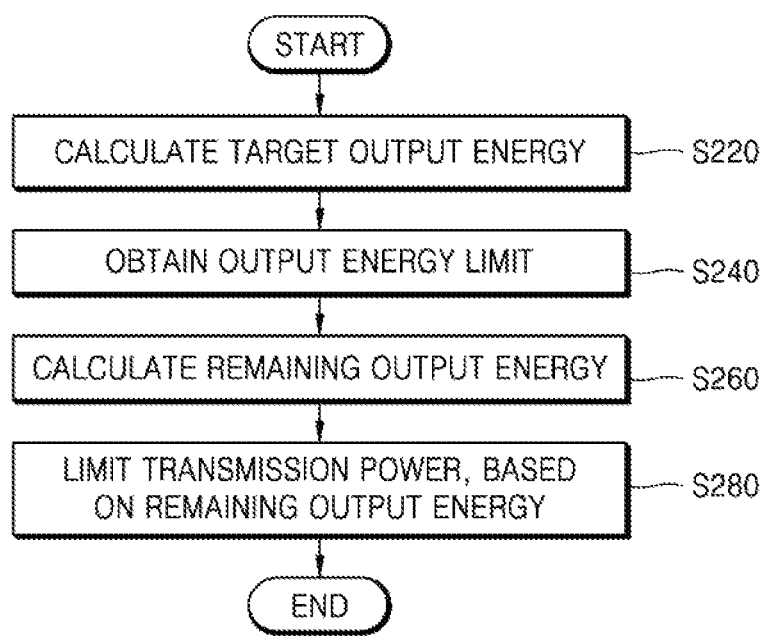
FIG. 12 is a flowchart of a method for controlling transmission power according to an exemplary embodiment of the inventive concept.

FIG. 12 shows a method for controlling transmission power, according to an exemplary embodiment of the inventive concept. As illustrated in FIG. 12, the method for controlling transmission power may include a plurality of operations S220, S240, S260, and S280. Compared to the method of FIG. 2, remaining output energy may be calculated based on an output energy limit and transmission power may be limited based on the remaining output energy in the method of FIG. 12. In some embodiments, the method of FIG. 12 may be performed by the data processor 17 of FIG. 1, so FIG. 12 will now be described in conjunction with FIG. 1. Descriptions provided above in relation to FIG. 2 will be omitted herein to avoid redundancy.

Referring to FIG. 12, in the operation S220, similar to operation S120 of FIG. 2, target output energy may be calculated. In some embodiments, the target output energy may be calculated as shown in [Equation 2] or [Equation 4], or be adjusted as described above in relation to FIG. 5. In the next operation S240, similar to operation S240 of FIG. 2, an output energy limit may be obtained. In some embodiments, the output energy limit may be adjusted based on the proximity information PRX as described above in relation to FIG. 6.

In the next operation S260, remaining output energy may be calculated. The remaining output energy may refer to a maximum usable energy complying with the output energy limit. For example, as described below with reference to FIGS. 13 and 14, the data processor 17 may divide a measurement period into a plurality of periods having equal durations, and determine output energy of the divided periods based on the remaining output energy.

In the next operation S280, transmission power may be limited based on the remaining output energy. For example, the output energy of the divided periods may not be limited when the remaining output energy calculated in operation S260 is sufficient, or the output energy of the divided periods may be limited and thus the transmission power may be limited when the remaining output energy is not sufficient. An example of operation S280 will be described below with reference to FIG. 15.

Figure 13:
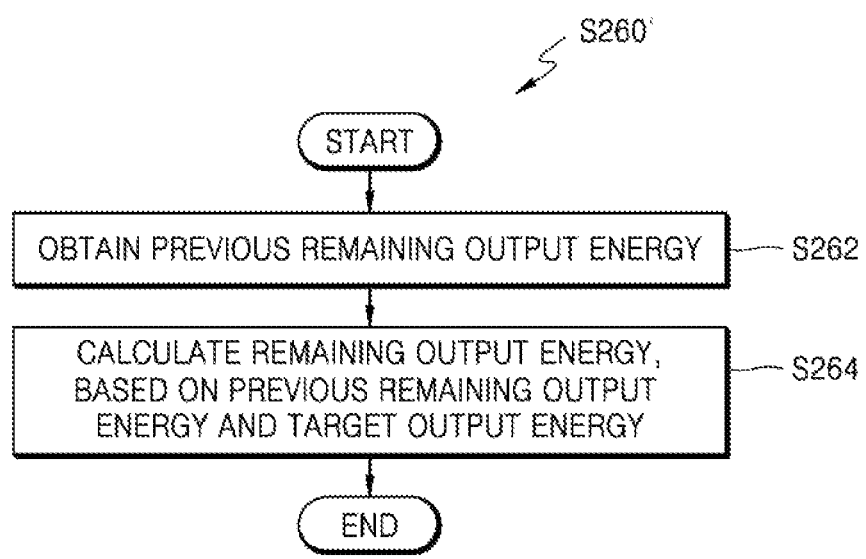
FIG. 13 is a flowchart of method for controlling transmission power according to an exemplary embodiment of the inventive concept.
Figure 14:
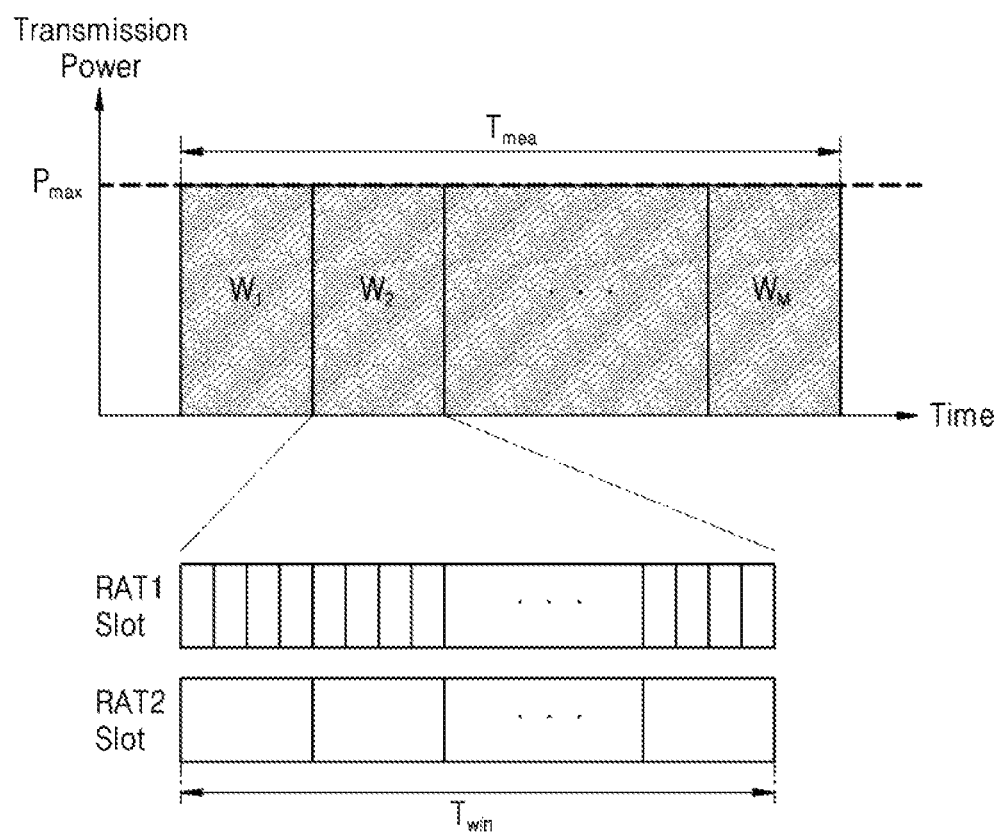
FIG. 14 is a timewise graphical diagram for describing an operation of calculating remaining output energy according to an exemplary embodiment of the inventive concept.

FIG. 13 shows a method for controlling transmission power, according to an exemplary embodiment of the inventive concept, and FIG. 14 shows an example of an alternate operation S260' of FIG. 13, according to an embodiment of the inventive concept. Specifically, the flowchart of FIG. 13 shows an alternate example of the operation S260 of FIG. 12. As described above in relation to FIG. 12, remaining output energy may be calculated in operation S260' of FIG. 13. In some embodiments, operation S260' may be performed by the data processor 17 of FIG. 1, so FIGS. 13 and 14 will now be described in conjunction with FIG. 1.

Referring to FIG. 13, the operation S260' may include operations S262 and S264. In the operation S262, previous remaining output energy may be obtained. When maximum transmission power $P_{max}$ is adjustable as described above in relation to FIG. 7, an output energy limit $E_{max}$ may be expressed as shown in [Equation 8] and refer to the amount of energy usable by the UE 10.

$$E_{max} = \int_0^{T_{mea}} P_{max} dt \quad \text{[Equation 8]}$$

The data processor 17 may divide a measurement period $T_{mea}$ into a plurality of periods having equal durations. For example, as illustrated in FIG. 14, the data processor 17 may divide the measurement period $T_{mea}$ into M periods (M is an integer greater than 1), and each of the M periods may have a duration $T_{win}$ corresponding to 1/M of the measurement period $T_{mea}$. In this specification, the periods divided from the measurement period $T_{mea}$ may be called windows, and the measurement period $T_{mea}$ may be divided into first to $M^{th}$ windows $W_1$ to $W_M$ as illustrated in FIG. 14. Although the sub-periods or windows $T_{win}$ described herein are of equal duration for ease of description, the sub-periods may be different in alternate embodiments.

When the UE 10 is connected to two or more wireless communications systems, all electromagnetic waves due to the connection to the two or more wireless communications systems may be required to comply with SAR regulations. Different wireless communications systems, such as, for example, 5G NR and LTE systems, may define different slot durations and, in some embodiments, a window may have the duration $T_{win}$ corresponding to a common multiple of slot durations. For example, as illustrated in FIG. 14, a slot duration of a first wireless communications system RAT1 may correspond to ¼ of a slot duration of a second wireless communications system RAT2, and thus $T_{win}$ may be a multiple of the slot duration of the second wireless communications system RAT2. In some embodiments, $T_{win}$ may be several tens of milliseconds (ms) to several hundred ms. Considering that a measurement period may be several seconds to several tens of seconds, different timings between slots of the first and second wireless communications systems RAT1 and RAT2 may be ignored.

When the UE 10 is connected to a 5G NR system together with an LTE system, transmission power $P_{NR}(k)$ of a $k^{th}$ slot is defined according to [Equation 1] and, when a window includes K slots of the 5G NR system, output energy $E_{NR}(m)$ in an $m^{th}$ window due to the 5G NR system may be expressed as shown in [Equation 9].

$$E_{NR}(m) = \sum_{k=1}^{K} T_{NR,symbol} \cdot P_{NR}(k) \quad \text{[Equation 9]}$$

When a window includes L slots of the LTE system and a slot duration of the LTE system is denoted by $T_{LTE,slot}$, output energy $E_{LTE}(m)$ in the $m^{th}$ window due to the LTE system may be expressed as shown in [Equation 10].

$$E_{LTE}(m) = \sum_{l=1}^{L} T_{LTE,slot}(P_{LTE,PUCCH}(l) + P_{LTE,PUSCH}(l)) \quad \text{[Equation 10]}$$

As such, energy E(m) output in the $m^{th}$ window may be expressed as shown in [Equation 11].

$$E(m) = E_{NR}(m) + E_{LTE}(m) \quad \text{[Equation 11]}$$

Remaining output energy $E_{remaining}(n)$ in an $n^{th}$ window (n>M) may be calculated in a sequential manner as shown in [Equation 12].

$$E_{remaining}(1) = E_{max} \quad \text{[Equation 12]}$$
$$E_{remaining}(2) = E_{remaining}(1) - E(2)$$
$$\vdots$$
$$E_{remaining}(M) = E_{remaining}(M-1) - E(M)$$
$$E_{remaining}(M+1) = E_{remaining}(M) - E(M+1) + E(1)$$
$$\vdots$$
$$E_{remaining}(n) = E_{remaining}(n-1) - E(n) + E(n-M)$$

As such, to calculate the remaining output energy $E_{remaining}(n)$ of the current $n^{th}$ window, the data processor 17 may obtain remaining output energy $E_{remaining}(n-1)+E(n-M)$ of previous M-1 windows. To this end, the data processor 17 may store M output energy values of previous M windows in a memory.

In the next operation S264, remaining output energy may be calculated based on the previous remaining output energy and target output energy. For example, the data processor 17 may calculate the remaining output energy $E_{remaining}(n)$ of the current $n^{th}$ window by subtracting target output energy E(n) of the $n^{th}$ window from the previous remaining output energy $E_{remaining}(n-1)+E(n-M)$ as shown in [Equation 12].

Figure 15:
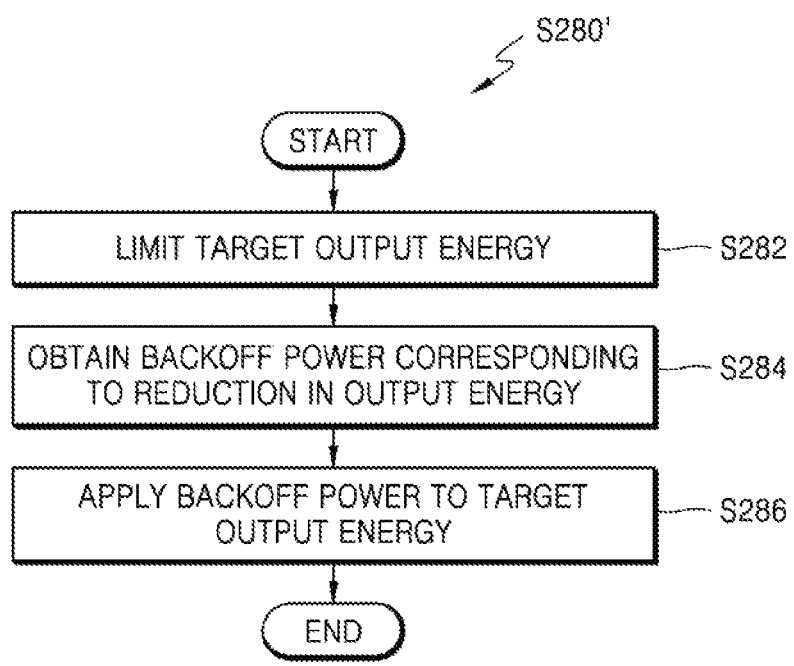
FIG. 15 is a flowchart of a method for controlling transmission power according to an exemplary embodiment of the inventive concept.

FIG. 15 shows a method for controlling transmission power, according to an exemplary embodiment of the inventive concept. Specifically, the flowchart of FIG. 15 shows an alternate example of an operation S280 of FIG. 12. As described above in relation to FIG. 12, transmission power may be limited based on remaining output energy in an alternate operation S280' of FIG. 15. Compared to operation S180' of FIG. 9, target output energy may be limited in operation S280' of FIG. 15. In some embodiments, the method of FIG. 15 may be performed by the data processor 17 of FIG. 1, FIG. 15 will now be described in conjunction with FIG. 1, and descriptions provided above in relation to FIG. 9 will be omitted herein to avoid redundancy.

In the operation S282, target output energy may be limited. For example, the data processor 17 may limit target output energy E(n) of a current $n^{th}$ window based on remaining output energy $E_{remaining}(n)$ as shown in [Equation 13].

$$E(n) = \begin{cases} E(n) & \text{if } E_{remaining}(n-1) > \beta \cdot E_{max} \\ \min(E(n), E(n-M)) & \text{else} \end{cases} \quad \text{[Equation 13]}$$

In [Equation 13], β may be greater than 0 (zero) and less than 1 (0<β<1), and high remaining output energy may be maintained when β has a large value and low remaining output energy may be maintained when β has a small value.

In some embodiments, β may be determined based on the size of an error between output energy calculated by the data processor 17 and energy actually radiated by the UE 10. For example, the UE 10 may include an energy source for wireless communications and another energy source for generating electromagnetic waves, and an error between output energy of the first to fourth antenna modules 11 to 14 and energy radiated from the UE 10 may occur due to various reasons. According to [Equation 13], when the remaining output energy is less than a reference value (i.e., $\beta E_{max}$) due to the target output energy of the current window, the target output energy of the current window may be limited to energy of windows not included in a measurement period (i.e., E(n−M)).

In the next operation S284, backoff power corresponding to a reduction in output energy may be obtained. In some embodiments, as described above in relation to FIG. 10, the data processor 17 may obtain the backoff power with reference to a lookup table including a plurality of output energy reduction-backoff power pairs, or from an artificial neural network trained with a plurality of sample energy margin-backoff power pairs.

In the next operation S286, the backoff power may be applied to the target output energy. For example, the data processor 17 may reduce transmission power by the backoff power, and control the first to fourth antenna modules 11 to 14 based on the reduced transmission power. As described above in relation to FIG. 11, when the backoff power is large, to improve QoS in wireless communication, the data processor 17 may attempt or determine whether to switch an antenna module used for communication.

Figure 16:
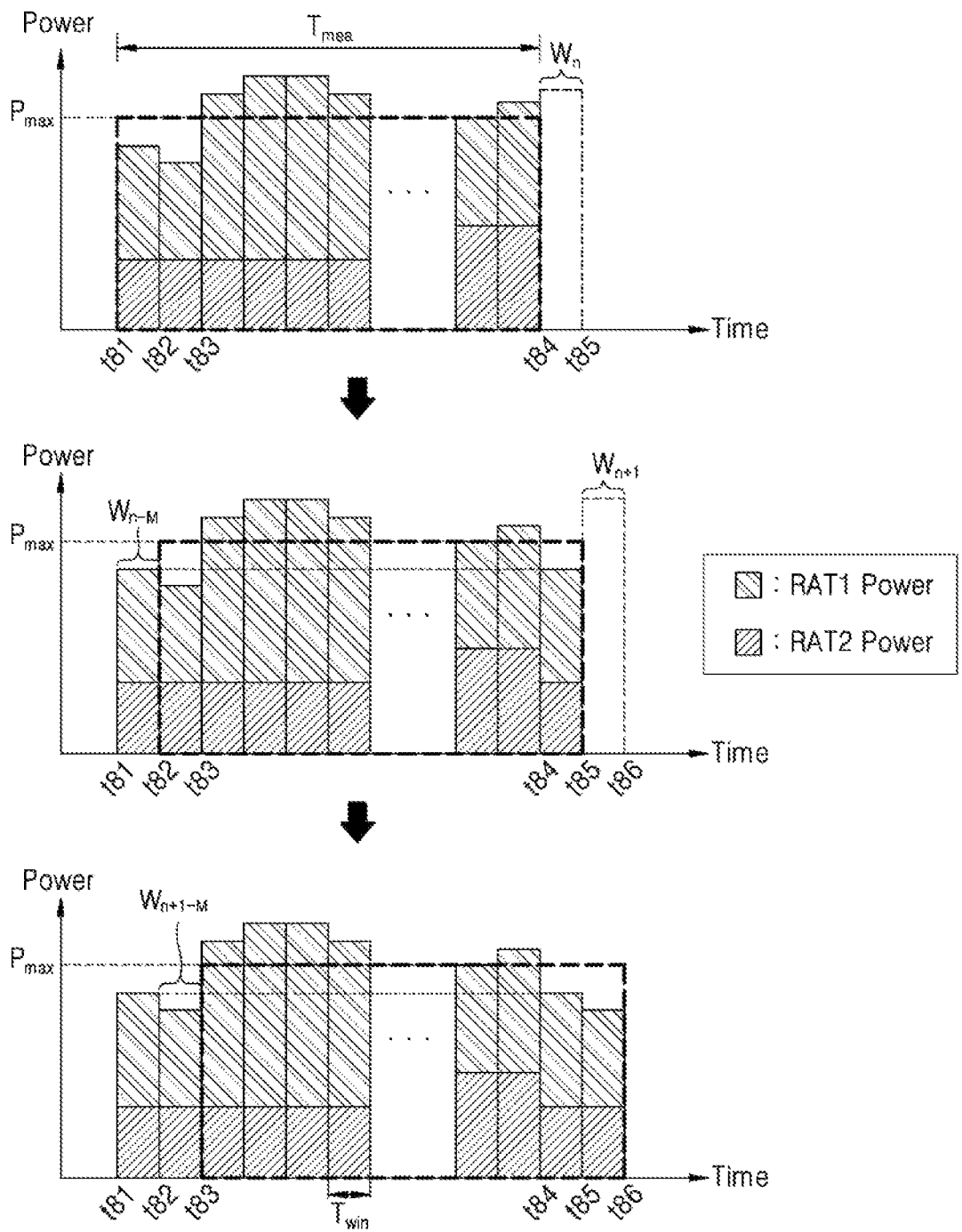
FIG. 16 includes a sequence of timewise graphical diagrams for describing an operation of limiting transmission power according to an exemplary embodiment of the inventive concept.

FIG. 16 shows an example of the operation S280' of FIG. 15, according to an exemplary embodiment of the inventive concept. FIG. 16 will now be described in conjunction with FIG. 15.

Referring to an upper graph of FIG. 16, a measurement period $T_{mea}$ may correspond to a period from a time t81 to a time t84, and an average of transmission power values of windows in the period from the time t81 to the time t84 may be less than maximum transmission power $P_{max}$. Target transmission power of an $n^{th}$ window $W_n$ corresponding to a period from the time t84 to a time t85 may be calculated as indicated by a dashed line and, referring to a middle graph of FIG. 16, the target transmission power of the $n^{th}$ window $W_n$ may be limited based on remaining output energy. That is, when the remaining output energy is not sufficient (i.e., $E_{remaining}(n) \leq \beta E_{max}$), transmission power of the $n^{th}$ window $W_n$ may be limited to transmission power of an $(n-M)^{th}$ window $W_{n-M}$ corresponding to a period from the time t81 to the time t82, and thus the average of the transmission power values of the windows in the measurement period $T_{mea}$ corresponding to a period from the time t82 to the time t85 may be less than the maximum transmission power $P_{max}$.

Referring to the middle graph of FIG. 16, the measurement period $T_{mea}$ may correspond to a period from the time t82 to the time t85. Target transmission power of an $(n+1)^{th}$ window $W_{n+1}$ corresponding to a period from the time t85 to a time t86 may be calculated as indicated by a dashed line and, referring to a lower graph of FIG. 16, the target transmission power of the $(n+1)^{th}$ window $W_{n+1}$ may be limited based on remaining output energy. That is, when the remaining output energy is not sufficient (i.e., $E_{remaining}(n+1) \leq \beta E_{max}$), transmission power of the $(n+1)^{th}$ window $W_{n+1}$ may be limited to transmission power of an $(n+1-M)^{th}$ window $W_{n+1-M}$ corresponding to a period from the time t82 to the time t83, and thus the average of the transmission power values of the windows in the measurement period $T_{mea}$ corresponding to a period from the time t83 to the time t86 may be less than the maximum transmission power $P_{max}$.

Figure 17:
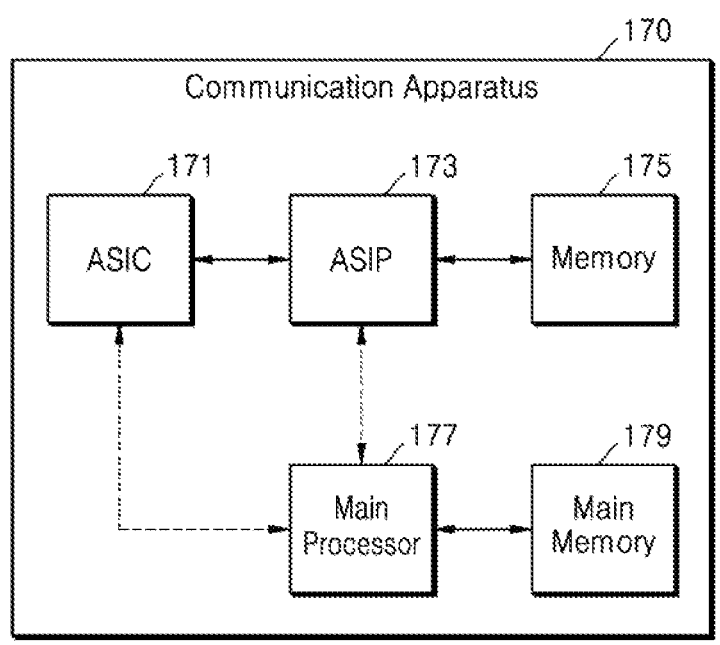
FIG. 17 is a schematic block diagram of a communications apparatus according to an exemplary embodiment of the inventive concept.

FIG. 17 shows an example of a communications apparatus 170 according to an exemplary embodiment of the inventive concept. In some embodiments, the communications apparatus 170 may be included in the UE 10 of FIG. 1.

As illustrated in FIG. 17, the communications apparatus 170 may include an application-specific integrated circuit (ASIC) 171, an application-specific instruction set processor (ASIP) 173, a memory 175, a main processor 177, and a main memory 179. In some embodiments, two or more of the ASIC 171, the ASIP 173, and the main processor 177 may communicate with each other. In some embodiments, two or more of the ASIC 171, the ASIP 173, the memory 175, the main processor 177, and the main memory 179 may be embedded in a chip.

As an integrated circuit customized for a specific purpose, the ASIP 173 may support a dedicated instruction set for a specific application, and execute instructions included in the instruction set. The memory 175 may communicate with the ASIP 173 and store, as a non-transitory storage device, a plurality of instructions to be executed by the ASIP 173. The term "non-transitory" as used herein describes the medium itself, which is tangible rather than a mere signal. For example, the memory 175 may include, but is not limited to, an arbitrary type of memory such as, for example, flash memory, random access memory (RAM), read only memory (ROM), magnetic tape, a magnetic disk, an optical disk, volatile memory, non-volatile memory, or a combination thereof.

In some embodiments, the memory 175 may store the above-described output energy limit, the lookup table 100 of FIG. 10, and the like.

The main processor 177 may control the communications apparatus 170 by executing a plurality of instructions. For example, the main processor 177 may control the ASIC 171 and the ASIP 173, and process data received through a wireless communications network or user input related to the communications apparatus 170. The main memory 179 may communicate with the main processor 177 and store, as a non-transitory storage device, a plurality of instructions to be executed by the main processor 177. For example, the main memory 179 may include, but is not limited to, an arbitrary type of memory as described above.

A method for controlling transmission power may be performed by at least one of the elements included in the communications apparatus 170 of FIG. 17. In some embodiments, operation of the data processor 17 of FIG. 1 may be implemented by a plurality of instructions stored in the memory 175, and the ASIP 173 may perform at least one of operations of the method for controlling transmission power, by executing the plurality of instructions stored in the memory 175. In some embodiments, at least one of the operations of the method for controlling transmission power may be performed by a hardware block designed through logic synthesis or the like, and the hardware block may be included in the ASIC 171. In some embodiments, at least one of the operations of the method for controlling transmission power may be implemented by a plurality of instructions stored in the main memory 179, and the main processor 177 may perform at least one of the operations of the method for controlling transmission power by executing the plurality of instructions stored in the main memory 179.

While the inventive concept has been particularly shown and described with reference to exemplary embodiments thereof, it will be understood that various changes in form and details may be made therein by those of ordinary skill in the pertinent art without departing from the scope and spirit of the inventive concept as defined by the following claims and their equivalents.

What is claimed is:

1. A method for controlling a transmission power of a wireless communications device to comply with an output energy limit during a measurement period, the method comprising:
calculating a target output energy based on a communications channel;
obtaining a first average output energy corresponding to a previous period having a duration substantially equal to the measurement period;
calculating a second average output energy by low-pass-filtering the target output energy and the first average output energy; and
limiting the transmission power of the wireless communications device based on an energy margin between the output energy limit and the second average output energy.

2. The method of claim 1, wherein the calculating of the target output energy comprises:
calculating a target transmission power of a unit interval based on the communications channel; and
calculating the target output energy based on the target transmission power and the unit interval.

3. The method of claim 1, wherein the calculating of the target output energy comprises:
obtaining measurement information comprising at least one of power detected or temperature sensed in a transmission path; and
adjusting the target output energy based on the measurement information.

4. The method of claim 1, wherein:
the calculating of the second average output energy comprises calculating the second average output energy by accumulatively filtering the target output energy and the first average output energy.

5. The method of claim 1, wherein:
the calculating of the second average output energy comprises calculating the second average output energy by finite impulse response (FIR)-filtering the target output energy and output energy values corresponding to unit intervals comprised in the previous period.

6. The method of claim 1, wherein:
the wireless communications device is connectable to a plurality of wireless communications systems, and
the calculating of the second average output energy comprises calculating the second average output energy based on transmission power used for connection to two or more of the plurality of wireless communications systems during the previous period.

7. The method of claim 1, further comprising:
obtaining proximity information for an object in proximity to the wireless communications device; and
adjusting the output energy limit based on the proximity information.

8. The method of claim 1, wherein the limiting of the transmission power comprises:
obtaining backoff power corresponding to the energy margin; and
applying the backoff power to the target output energy.

9. The method of claim 8, wherein:
the wireless communications device comprises a plurality of antenna modules each comprising an antenna, and the applying of the backoff power comprises determining whether to switch an antenna module used for wireless communication to another of the plurality of antenna modules when the backoff power is greater than a threshold value.

10. A method for controlling a transmission power of a wireless communications device to comply with an output energy limit during a measurement period divided into a plurality of windows, the method comprising:
calculating a target output energy for at least one of the plurality of windows based on a communications channel;
obtaining a first remaining output energy for a first of the plurality of windows based on the output energy limit and the target output energy;
calculating a second remaining output energy for a remainder of the plurality of windows based on the target output energy and the first remaining output energy; and
limiting the transmission power based on the output energy limit and the second remaining output energy.

11. The method of claim 10, wherein:
the wireless communications device is connectable to a plurality of wireless communications systems, and
the calculating of the target output energy comprises:
accumulating transmission power used for connection to a first wireless communications system during the first of the plurality of windows; and
accumulating transmission power used for connection to a second wireless communications system during the first of the plurality of windows.

12. The method of claim 10, wherein the calculating of the target output energy comprises:
obtaining measurement information comprising at least one of power detected and temperature sensed in a transmission path; and
adjusting the target output energy based on the measurement information.

13. The method of claim 10, further comprising:
obtaining proximity information of an object in proximity to the wireless communications device; and
adjusting the output energy limit based on the proximity information.

14. The method of claim 10, wherein the limiting of the transmission power comprises:
limiting the target output energy based on the output energy limit and the second remaining output energy;
obtaining backoff power corresponding to a reduction in the target output energy; and
applying the backoff power to the target output energy.

15. The method of claim 14, wherein:
the wireless communications device comprises a plurality of antenna modules each comprising an antenna, and
applying the backoff power comprises determining whether to switch an antenna module used for wireless communication to another of the plurality of antenna modules when the backoff power is greater than a threshold value.

16. A wireless communications device for controlling a transmission power to comply with an output energy limit during a measurement period divided into a plurality of windows, the wireless communications device comprising:
at least one antenna module comprising an antenna, a power detector, and a temperature sensor;

a back-end module configured to provide, to the at least one antenna module, a high-frequency signal generated by processing a baseband signal in a transmission mode; and a signal processing unit configured to generate the baseband signal in the transmission mode, wherein the signal processing unit is further configured to adjust target output energy for a current one of the plurality of windows based on measurement information provided from the power detector and the temperature sensor, calculate an energy margin based on output energy output during a previous at least one of the plurality of windows, the adjusted target output energy and the output energy limit, and limit the transmission power based on the energy margin.

17. The wireless communications device of claim 16, further comprising a proximity sensor configured to sense an object in proximity to the wireless communications device, wherein the signal processing unit is further configured to adjust the output energy limit based on proximity information from the proximity sensor.

18. The wireless communications device of claim 16, wherein:

the signal processing unit is further configured to calculate average output energy by low-pass-filtering the output energy and the target output energy, and calculate the energy margin between the adjusted output energy limit and the average output energy.

19. The wireless communications device of claim 16, wherein:

the previous at least one of the plurality of windows corresponds to (M−1)/M of the measurement period, where M is an integer greater than 1, the target output energy corresponds to energy output during a the current one of the plurality of windows having a duration equal to 1/M of the measurement period, and the signal processing unit is further configured to calculate the energy margin as a difference between the adjusted output energy limit and a sum of the output energy and the target output energy.

20. The wireless communications device of claim 16, further comprising a lookup-table storing a plurality of energy margin-backoff power pairs, wherein the signal processing unit is further configured to obtain backoff power corresponding to the energy margin by referring to the lookup-table, and determine whether to switch an antenna module used for wireless communications from among a plurality of antenna modules comprising the at least one antenna module when the obtained backoff power is greater than a threshold value.

* * * * *